United States Patent [19]

De Borde

[11] Patent Number: 5,416,423

[45] Date of Patent: May 16, 1995

[54] METHOD AND APPARATUS FOR VERIFYING THE INTEGRITY OF A SMART CARD

[75] Inventor: Duncan O. De Borde, Liverpool, United Kingdom

[73] Assignee: GPT Limited, United Kingdom

[21] Appl. No.: 218,766

[22] Filed: Mar. 28, 1994

[30] Foreign Application Priority Data

Apr. 7, 1993 [GB] United Kingdom ............... 9307252

[51] Int. Cl.[6] .......................... G01R 27/26; G06K 7/04
[52] U.S. Cl. ..................... 324/677; 235/437; 235/441
[58] Field of Search ............... 324/659, 677, 678, 658, 324/537; 235/437, 438, 441, 380

[56] References Cited

U.S. PATENT DOCUMENTS

| | | | |
|---|---|---|---|
| 3,564,343 | 3/1970 | Ditlow | 235/441 |
| 4,226,361 | 10/1980 | Taylor | 235/441 |
| 4,433,286 | 2/1984 | Capots et al. | 324/659 |
| 4,785,166 | 11/1988 | Kushima | 235/441 |
| 4,792,667 | 12/1988 | Chen | 235/441 |
| 4,985,614 | 1/1991 | Pease et al. | 235/437 |
| 5,032,708 | 7/1991 | Comerford et al. | 235/441 |
| 5,045,674 | 9/1991 | Mita et al. | 235/441 |
| 5,122,754 | 7/1992 | Gotaas | 324/677 |
| 5,146,068 | 9/1992 | Ugawa et al. | 235/441 |
| 5,198,645 | 3/1993 | Martin et al. | 235/441 |

*Primary Examiner*—Maura K. Regan
*Attorney, Agent, or Firm*—Kirschstein, Ottinger, Israel & Schiffmiller

[57] ABSTRACT

A Contact Smart Card (3) is inserted in a contact card reader and its capacitance is measured by applying a square wave generated by an oscillator (1) to it via a resistor (4). The capacitance effect of the smart card (3) affects the amplitude of the output from the resistor (1) and the output is monitored in an amplitude detector (2) connected to receive the signal output from the resistor (4) and to compare it against a threshold level for the signal previously established and stored for an acceptable card.

8 Claims, 2 Drawing Sheets (a). SQUARE WAVE OUTPUT FROM OSCILLATOR (b). OUTPUT FROM RESISTOR, SHOWING CAPACITATIVE EFFECTS (c). INCREASING CAPACITANCE REDUCES SIGNAL AMPLITUDE (d). AMPLITUDE DECREASES FURTHER AS CAPACITANCE INCREASES

METHOD AND APPARATUS FOR VERIFYING THE INTEGRITY OF A SMART CARD

BACKGROUND OF THE INVENTION

1. Field of the Invention

This invention relates to a method and apparatus for verifying the integrity of a Smart Card.

2. Description of the Related Art

"Smart Cards" are cards normally of a plastics material having embedded in them circuitry and active or passive components which carry information in coded form. These cards are used as enabling devices and can have the information in them altered or changed at will and information can be read out from the card to check an identity or authority when the card is used as a key or pass card.

Although some Smart Cards may include their own power source such as a built in battery or may be activated externally by an induction or capacitative connection many rely on actual physical connections to host device. The present invention is particularly concerned with such cards which are hereinafter referred to as 'Contact Smart Cards'. Since the cards may be used as a money substitute or for enabling a privileged access it is important that only truly authenticated cards are able to be used and that false cards or simulations of card effects are detected and are unable to be used. The cards may, for example, be used in such areas as to permit travel on a transit system or to operate decoders for pay television or in public telecommunication networks or for the access to personal and confidential information.

With the increasing reliance on Smart Cards in such areas, it is important that the host system cannot be deceived by anything which is not a genuine Smart Card, issued by the controlling authority.

The possibility of simulating the behaviour of certain types of Smart Cards has been demonstrated, using only a basic circuit consisting of easily available electronic components. This opens the way for a person with a basic knowledge of electronics to by-pass payment or compromise security.

Knowing that it is possible for an unscrupulous person to build such a circuit, which can be functionally indistinguishable from a genuine card, some means is required to detect whether the Smart Card presented is in fact genuine, or is a simulated card.

An effective way of distinguishing between genuine Smart Cards and Smart Card simulating circuits would be to detect the presence of the wires which would be required to connect such a circuit to the Smart Card reader contacts.

Traditional methods of detecting the connecting wires have involved coils mounted around the card reader entry slot. This involves the difficulty and expense of mechanically mounting these coils. These methods can also be overcome by reducing the amount of metal used in the connecting wires such that the response is negligible.

SUMMARY OF THE INVENTION

It is an object of the present invention to provide an improved method of verifying the authenticity of Smart Cards by recognising the effects of excess lengths of wires to determine counterfeit cards or false simulations of cards.

According to the present invention in a method for verifying a Contact Smart Card of the kind hereinbefore defined, the method includes the step of detecting the capacitance of any wires connecting the Contact Smart Card to the host apparatus, applying a signal to the Contact Smart Card and comparing the effect of the signal on a detector with the results previously obtained from a genuine and authorised card to establish whether a proper card or a false or simulated card is being used.

The signal is preferably produced by a square wave oscillator in square wave forma and fed through a resistor to a Smart Card to give with the capacitance effect of the wire and RC time constant. The method includes monitoring the rise and fall times of the signal. The rise and fall may be monitored by an amplitude detector connected between the said resistor and the card being verified. The method allows only cards to be verified which have rise and fall times falling within present limits determined by prior calibration.

The invention further includes, according to a further aspect, a square wave oscillator a resistor and an amplitude detector for carrying out the above method.

The method and apparatus of the invention do not require any components to be mounted around the card reader slot. Only a few simple electronic components are required, and these may be fitted on the same PCB as the rest of the components of a Smart Card interface, wherever it is located.

BRIEF DESCRIPTION OF THE DRAWINGS

In order that the invention may be readily understood, one example of apparatus in accordance therewith and using the operation of the method thereof will now be described by way of example only, with reference to the two figures of the accompanying drawings.

In the drawings

DETAILED DESCRIPTION OF THE PREFERRED EMBODIMENTS

The Contact Smart Card to be verified has external contacts which mate with corresponding contacts when it is plugged into a host apparatus. This invention uses apparatus which has been developed to protect against simulation of a Smart Card by external circuitry.

If any such circuitry is connected to the host system, via wires, extra capacitance is introduced on the Smart Card signals. The wire detection method outlined uses this extra capacitance to distinguish between a genuine Contact Smart Card and a simulating circuit. The increase in capacitance due to connecting wires is likely to be small compared to other variable effects, such as component tolerances, cable capacitances or environmental conditions. To counteract these variations, it is not the absolute value for the capacitance which is used to decide whether wires are present, but the change when a card is inserted.

Figure 1:
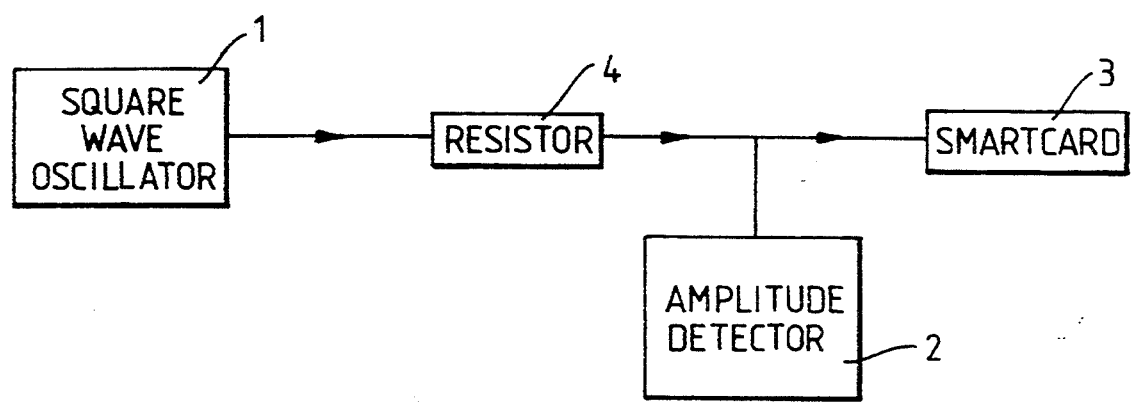
FIG. 1 is a schematic block diagram of the layout of a suitable form of circuitry and FIGS. 2a, 2b, 2c and 2d show four wave forms explaining the operation of the invention.

Referring first to FIG. 1 of the drawings, the wire detect circuitry shown has two major sections, a square wave oscillator 1 and an amplitude detector 2.

The oscillator 1 generates a square wave of fixed frequency, which is buffered to a Contact Smart Card 3. A resistor 4 is connected between this buffered output and the Contact Smart Card connection.

Both the frequency of the oscillator and the resistor value are chosen according to the residual capacitance in the host system. With no card inserted, the signal falls short of the maximum amplitude. Selection of the frequency and resistor value affect the variation in amplitude which will result from different capacitances.

The amplitude detector 2 is connected to the Contact Smart Card side of the resistor 4. Any form of amplitude detector which does not interfere with normal Smart Card operation will suffice. This amplitude detector must produce an output which will allow the host system to detect small changes in capacitance.

The wire detect method of the invention outlined relies on accurate measurement of the change in capacitance when a Contact Smart Card is presented to the host system. To achieve this, the host system must hold a recently updated calibration reading prior to card insertion. When a Contact Smart Card is inserted, the new reading is taken and can be compared with the calibration reading. The difference between the two indicates the capacitance added when the Contact Smart Card was inserted.

A threshold is set for the difference between the readings with and without a Contact Smart Card present. If the difference is less than this threshold, it can be assumed that the card is genuine. If the difference is greater than this threshold, the capacitance of the card is greater than would be expected, possibly due to the presence of wires, so the card may be rejected.

Thresholds are set according to experimental measurements. The variation in capacitance of genuine Contact Smart Cards are considered along with the likely capacitance due to the presence of wires or other effects, such as moisture.

Setting the thresholds for detecting wires involves a degree of compromise between guaranteeing the detection of wires and allowing for variation in the card capacitance, particularly due to the effects of moisture.

Referring now to FIGS. 2a, 2b, 2c and 2d, these show the various wave forms obtained.

Figure 2:
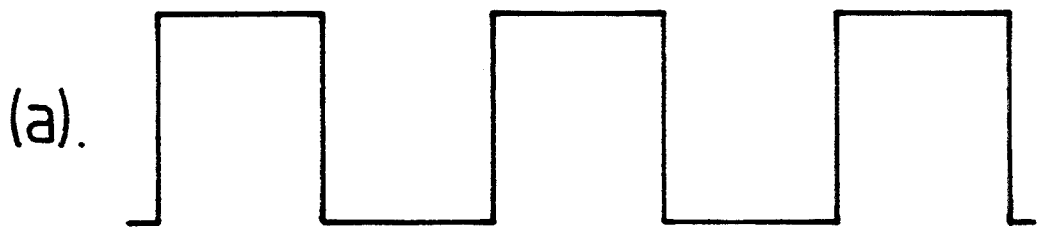
Figure 2:
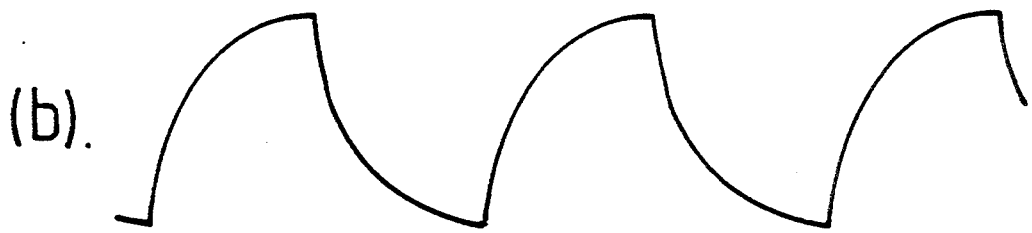
Figure 2:
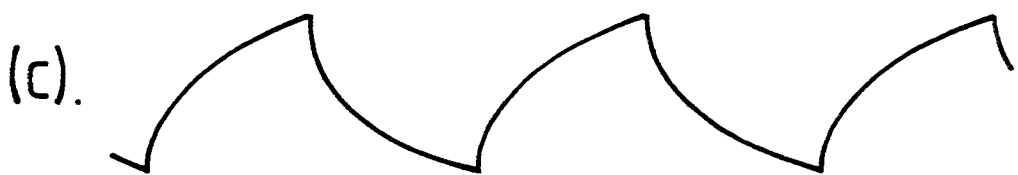
Figure 2:

In FIG. 2(a) a square wave from oscillator I is output through a resistor 4, down one of the Contact Smart Card signal lines. The presence of the resistor 4, in combination with the capacitance on that Contact Smart Card signal line, gives rise to an RC time constant and a signal form as in 2(b). This RC time constant affects the rise and fall times of the signal. When the rise and fall times approach half the period of the square wave, there is sufficient time for the output to rise or fall to its limits. Thus, the amplitude of the square wave starts to reduce. This capacitative effect is illustrated in FIG. 2(c).

A further increase in the capacitance on the Contact Smart Card signal line increases the RC time constant, giving longer rise and fall times. As the period is unchanged, the effect on the output is to reduce the change in voltage during the high or low periods. This gives a reduction in the signal amplitude as shown in FIG. 2(d).

The amplitude of the signal is thus dependent on the capacitance on the Contact Smart Card signal line. The larger the capacitance, the lower the signal amplitude.

If the host system is capable of measuring the signal amplitude following the resistor, it can determine changes in the capacitance.

It will be appreciated that the method described above has been developed to protect against simulation of a Contact Smart Card by external circuitry. If any such circuitry is connected to the host system, via wires, extra capacitance is introduced on the Contact Smart Card signals. The wire detection method outlined uses this extra capacitance to distinguish between a genuine Contact Smart Card and a simulating circuit.

The increase in capacitance due to connecting wires is likely to be small compared to other variable effects, such as component tolerances, cable capacitances or environmental conditions. To counteract these variations, it is not the absolute value for capacitance which is used to decide whether wires are present, but the change when the card is inserted.

It will further be appreciated that although a number of variations of apparatus can be used without departing from the method of the invention described, the method does produce a simple method of detecting the presence of wires in comparison to methods using coils. It is hence cheaper.

Despite this lack of complexity, the invention is reliable and is sufficiently sensitive to distinguish between Contact Smart Cards with and without wires attached and to verify genuine cards.

What is claimed is:

1. A method of verifying the integrity of a card under test having exterior contact terminals and on-board electronic circuitry containing coded data to be read in a host reader, comprising the steps of: detecting capacitance of wires connecting the card under test to the host reader, applying a signal to the card under test, and comparing a current result of the signal on a detector with a previous result obtained from a genuine and authorized card to establish whether the card under test is genuine.

2. A method as claimed in claim 1 wherein the applying step is performed by a square wave oscillator that generates the signal in square wave form and feeds the signal through a resistor to the card under test to provide a resistance-capacitance time constant.

3. A method as claimed in claim 1, including the step of monitoring rise and fall times of the square wave signal.

4. A method as claimed in claim 3, wherein the rise and fall times of the signal are monitored by an amplitude detector connected between the resistor and the card under test.

5. A method as claimed in claim 1, including the steps of calibrating the host reader by presenting the host reader with a known genuine card, measuring the capacitance of the genuine card, and storing the measured capacitance to provide a standard against which the capacitance of the card under test is assessed.

6. A method as claimed in claim 5, including setting, in a memory, threshold levels for the difference in reading between the card under test being present or absent in the host reader.

7. A method according to claim 7, including accepting the card under test as genuine if the capacitance of the card under test is measured as being below a threshold level.

8. Apparatus for verifying the integrity of a card under test having exterior contact terminals and on-board electronic circuitry containing coded data to be read in a host reader, comprising: means for detecting capacitance of wires connecting the card under test to the host reader, means for applying a signal to the card under test, and means for comparing a current result of the signal on the detecting means with a previous result obtained from a genuine and authorized card to establish whether the card under test is genuine.

* * * * *